US00RE44983E

(19) United States
(12) Reissued Patent
Schweng

(10) Patent Number: US RE44,983 E
(45) Date of Reissued Patent: Jul. 1, 2014

(54) ZOOM ALGORITHM

(75) Inventor: Detlef Schweng, Weinstadt-Schnait (DE)

(73) Assignee: Youliza, Gehts B.V. Limited Liability Company, Dover, DE (US)

(21) Appl. No.: 13/101,064

(22) Filed: May 4, 2011

Related U.S. Patent Documents

Reissue of:
(64) Patent No.: 7,529,427
Issued: May 5, 2009
Appl. No.: 10/830,154
Filed: Apr. 22, 2004

(30) Foreign Application Priority Data

Mar. 30, 2004 (EP) ..... 04392014

(51) Int. Cl.
*G06K 9/20* (2006.01)

(52) U.S. Cl.
USPC ..... 382/282; 382/132; 382/295; 382/300; 382/299; 348/280; 358/2.1

(58) Field of Classification Search
USPC ..... 382/282, 300, 295; 345/441, 472
See application file for complete search history.

(56) References Cited

U.S. PATENT DOCUMENTS 4,633,503 A 12/1986 Hinman
4,661,987 A 4/1987 Anderson et al.
4,809,345 A * 2/1989 Tabata et al. ..... 382/300
5,097,518 A * 3/1992 Scott et al. ..... 382/298
5,113,455 A * 5/1992 Scott ..... 382/298
5,125,043 A * 6/1992 Karlsson ..... 382/300
5,307,167 A 4/1994 Park et al.
5,384,862 A * 1/1995 Echerer et al. ..... 382/132
5,457,772 A 10/1995 Shannon
5,544,294 A * 8/1996 Cho et al. ..... 345/441
5,548,689 A 8/1996 Poppenga et al.

(Continued)

FOREIGN PATENT DOCUMENTS

EP 709825 5/1996
EP 811950 12/1997

(Continued)

OTHER PUBLICATIONS

Stolowitz Ford Cowger LLP; Related Case Listing; Aug. 24, 2011; 1 Page.

(Continued)

*Primary Examiner* — Vu Le
*Assistant Examiner* — Aklilu Woldemariam
(74) *Attorney, Agent, or Firm* — Stolowitz Ford Cowger LLP

(57) ABSTRACT

Methods to zoom a region of interest from a digital image have been achieved. The methods invented support according to the scale of zooming the decrease or the increase of the resolution of digital images. The region of interest to be zoomed is variable; the destination image has a fixed size. In case of a decrease of the resolution of the region of interest the method invented combines interpolating source pixels to calculate the color values of the destination pixels and omitting some rows of source pixels. In case of enlargement the method invented combines interpolation of the source pixels to calculate the color values of the destination pixels, extrapolation of the destination pixels being close to the edge of the image, and replication of some of the interpolated rows of the destination image to gain additional rows according to the scale of the increase of resolution (enlargement) of a digital image.

53 Claims, 3 Drawing Sheets

(56) References Cited

U.S. PATENT DOCUMENTS

| | | | | |
|---|---|---|---|---|
| 5,602,870 | A | 2/1997 | Hailey et al. | |
| 5,655,061 | A * | 8/1997 | Tse et al. | 358/1.2 |
| 5,689,425 | A | 11/1997 | Sainio et al. | |
| 5,691,768 | A | 11/1997 | Civanlar | |
| 5,740,267 | A * | 4/1998 | Echerer et al. | 382/132 |
| 5,742,708 | A * | 4/1998 | Yeh et al. | 382/299 |
| 5,754,710 | A * | 5/1998 | Sekine et al. | 382/300 |
| 5,774,133 | A * | 6/1998 | Neave et al. | 345/505 |
| 6,011,566 | A | 1/2000 | Salamon | |
| 6,047,085 | A | 4/2000 | Sato et al. | |
| 6,061,749 | A * | 5/2000 | Webb et al. | 710/65 |
| 6,091,513 | A | 7/2000 | Ishihara et al. | |
| 6,101,235 | A | 8/2000 | Zavaljevski et al. | |
| 6,181,376 | B1 * | 1/2001 | Rashkovskiy et al. | 348/273 |
| 6,252,906 | B1 | 6/2001 | Canfield | |
| 6,393,545 | B1 * | 5/2002 | Long et al. | 712/34 |
| 6,424,381 | B1 | 7/2002 | Mendenhall et al. | |
| 6,453,074 | B1 | 9/2002 | Zheng | |
| 6,498,868 | B1 * | 12/2002 | Klassen | 382/298 |
| 6,546,157 | B1 * | 4/2003 | Okuno et al. | 382/300 |
| 6,650,772 | B1 | 11/2003 | Inoue et al. | |
| 6,681,056 | B1 * | 1/2004 | Tseng et al. | 382/282 |
| 6,987,880 | B2 | 1/2006 | Dolan | |
| 7,046,399 | B2 | 5/2006 | Endo | |
| 7,196,821 | B2 | 3/2007 | Kakutani | |
| 7,218,355 | B2 | 5/2007 | Zhou et al. | |
| 7,365,880 | B2 * | 4/2008 | Yamamoto et al. | 358/2.1 |
| 7,529,427 | B2 | 5/2009 | Schweng | |
| 7,567,732 | B2 | 7/2009 | Schweng | |
| 2001/0020950 | A1 | 9/2001 | Shimizu et al. | |
| 2002/0033973 | A1 | 3/2002 | Dolan et al. | |
| 2002/0075285 | A1 * | 6/2002 | Morrison | 345/660 |
| 2002/0101618 | A1 | 8/2002 | Endo | |
| 2002/0136451 | A1 | 9/2002 | Dolan et al. | |
| 2002/0154123 | A1 * | 10/2002 | Harasimiuk | 345/472 |
| 2005/0058371 | A1 * | 3/2005 | Huang et al. | 382/300 |

FOREIGN PATENT DOCUMENTS

| | | |
|---|---|---|
| EP | 04392014 | 3/2004 |
| EP | 1583031 A1 | 10/2005 |
| EP | 1585310 A1 | 10/2005 |

OTHER PUBLICATIONS

U.S. Patent Application, filed Apr. 22, 2004, U.S. Appl. No. 10/830,329, assigned to the same assignee, "Image Resolution Conversion".

* cited by examiner

ZOOM ALGORITHM

Matter enclosed in heavy brackets [ ] appears in the original patent but forms no part of this reissue specification; matter printed in italics indicates the additions made by reissue.

This application is related to U.S. patent application Ser. No. 10/830,329, filed Apr. 27, 2004 and assigned to the same assignee as the present invention.

BACKGROUND OF THE INVENTION (1) Field of the Invention

This invention relates generally to image processing and relates more particularly to methods to zoom digital images.

(2) Description of the Prior Art

Either still images or time-varying image sequences are the input to digital imaging systems. A digital zoom capability uses algorithms and zooms in on the digital image in the camera. This can greatly improve the zoom capability of the camera and is less expensive than high-sophisticated zoom lenses, but also loses some image quality. The quality depends upon the algorithms used for zooming.

The challenge of the designers of digital zooming systems is to achieve fast performing methods for zooming providing good quality images and which are easy to be implemented.

There are various patents known dealing with said problems:

U.S. Patent (U.S. Pat. No. 6,101,235 to Zavaljevski et al.) describes methods and apparatus for altering the spatial characteristics of a digital image collected in a CT system using a real-time magnification algorithm. In accordance with one embodiment of the algorithm, once the digital image is collected, an enlarged image is generated by interpolating and filtering the original digital image data. In one aspect, two pass linear interpolation and one-dimensional filtering is utilized to generate the enlarged image. The first pass performs interpolation in the x direction and the second pass performs interpolation in the y direction. The interpolations in the x and y directions are performed in two steps. Initially, linear interpolation is applied to the original digital image to generate interpolated data. A one dimensional convolution filter is then applied to the interpolated data. Utilizing this process, a high quality enlarged image may be generated for any integer zoom factor. In another aspect of the present invention, a two-step procedure of interpolation and two-dimensional filtering is utilized. The first step performs bilinear interpolation of the digital image to generate interpolated data. The interpolated data is then filtered by a two-dimensional convolution filter.

U.S. Patent (U.S. Pat. No. 5,602,870 to Hailey et al.) discloses a spatial interpolation unit used to alter a digital image by performing a zoom operation thereon. Described is a spatial interpolation unit, which comprises a discrete set of filters for which at least some of the cut-off frequencies are logarithmically spaced.

U.S. Patent (U.S. Pat. No. 5,307,167 to Park et al.) describes a digital zoom system utilizing image buffers and employing an approximated bilinear interpolation method. The zoom system includes an analog-to-digital (A/D) converter for converting an analog image signal to a digital image signal, an image buffer for storing the digital image signal generated for said A/D converter, a horizontal operation circuit for interpolating the digital image signal taken along with a horizontal direction, one or more horizontal image buffers for storing the digital image signal for 1-horizontal lines magnified in a horizontal direction, a vertical operation circuit for interpolating said horizontally magnified image signal in a vertical direction, a timing controller for controlling the image buffer, said horizontal and vertical operation circuits, and a digital-to-analog (D/A) converter for converting the digital image signal finally magnified in the horizontal and vertical direction back to analog image signal.

SUMMARY OF THE INVENTION

A principal object of the present invention is to achieve a fast and efficient way to zoom a digital image.

In accordance with the object of this invention a method to zoom a region of interest from a digital image has been achieved. Said method comprises the following steps: (1) define size and location of region of interest as part of source image, (2) calculate scale of conversion in x- and y-direction, (3) calculate number of rows of pixels of destination image according to scale of conversion desired in y-direction, (4) calculate number of pixels contained in a row of pixels of destination image according to scale of conversion desired in x-direction, (5) calculate color values of each pixel along the rows of pixels of the destination image by interpolation from nearest row of pixels of source image, and (6) display zoomed region of interest in destination image.

In accordance with the object of this invention another method to zoom a region of interest from a digital image has been achieved. Said method comprises the following steps: (1) define size and location of region of interest as part of source image, (2) calculate scale of conversion in x- and y-direction, (3) calculate number of columns of pixels of destination image according to scale of conversion desired in x-direction, (4) calculate number of pixels contained in a column of pixels of destination image according to scale of conversion desired y-direction, (5) calculate color values of columns of pixels of destination image by interpolation from nearest column of pixels of source image, and (6) display zoomed region of interest in destination image.

In accordance with the object of this invention another method to zoom a region of interest from a digital image has been achieved. Said method comprises the following steps, first: (1) define size and location of region of interest as part of source image, (2) calculate scale of conversion in x- and y-direction, (3) calculate number of rows of pixels of destination image according to scale of conversion desired in y-direction, and (4) calculate number of pixels contained in a row of pixels of destination image according to scale of conversion desired in x-direction. Furthermore the method invented comprises the steps: (5) calculate x, y virtual starting point of destination pixel for each frame, (6) calculate virtual location of first destination pixel for new row in x-direction and interpolate new color values of color space of said first destination pixel from nearest source pixels located at nearest row of source pixels in y-direction, (7) calculate virtual position of next destination pixel in x-direction according to scale factor and interpolate new color values of color space used of said next pixel from nearest source pixels located at nearest row of source pixels in y-direction, (8) go to next step (8) if last destination pixel in x-direction has been reached otherwise go to step (6), (9) go to step (11) if last row of destination pixels has been reached otherwise go to next step (9), (10) calculate virtual location of next row in y-direction according to scale factor in y-direction and go to step (5), and (11) display zoomed region of interest in destination image.

In accordance with the object of this invention another method to zoom a region of interest from a digital image has been achieved. Said method comprises the following steps, first: (1) define size and location of region of interest as part of source image, (2) calculate scale of conversion in x- and y-direction, (3) calculate number of columns of pixels of destination image according to scale of conversion desired in x-direction, (4) calculate number of pixels contained in a column of pixels of destination image according to scale of conversion desired in y-direction, and (5) calculate x, y virtual starting point of destination pixel for each frame. Furthermore the method invented comprises the steps: (6) calculate virtual location of first destination pixel for new column in y-direction and interpolate new color values of color space of said first destination pixel from nearest source pixels located at nearest column of source pixels in x-direction, (7) calculate virtual position of next destination pixel in y-direction according to scale factor and interpolate new color values of color space used of said next pixel from nearest source pixels located at nearest column of source pixels in x-direction, (8) go to next step (8) if last destination pixel in y-direction has been reached otherwise go to step (6), (9) go to step (11) if last column of destination pixels has been reached otherwise go to next step (9), (10) calculate virtual location of next column in x-direction according to scale factor in x-direction and go to step (5), and (11) display zoomed region of interest in destination image.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose a novel method to zoom digital images. Said method is based on the methods to convert the resolution of digital images disclosed with U.S. patent application Ser. No. 10/830,329 docket number DS03-025, filed Apr. 27, 2004 and assigned to the same assignee as the present invention. In order to be able to use said methods to convert the resolution for zooming the region of interest of the source image has to be defined prior to a change of resolution and the offsets have to be defined in a special way. The methods of the present invention apply to video images as well as to still images of a digital camera.

Figure 1:
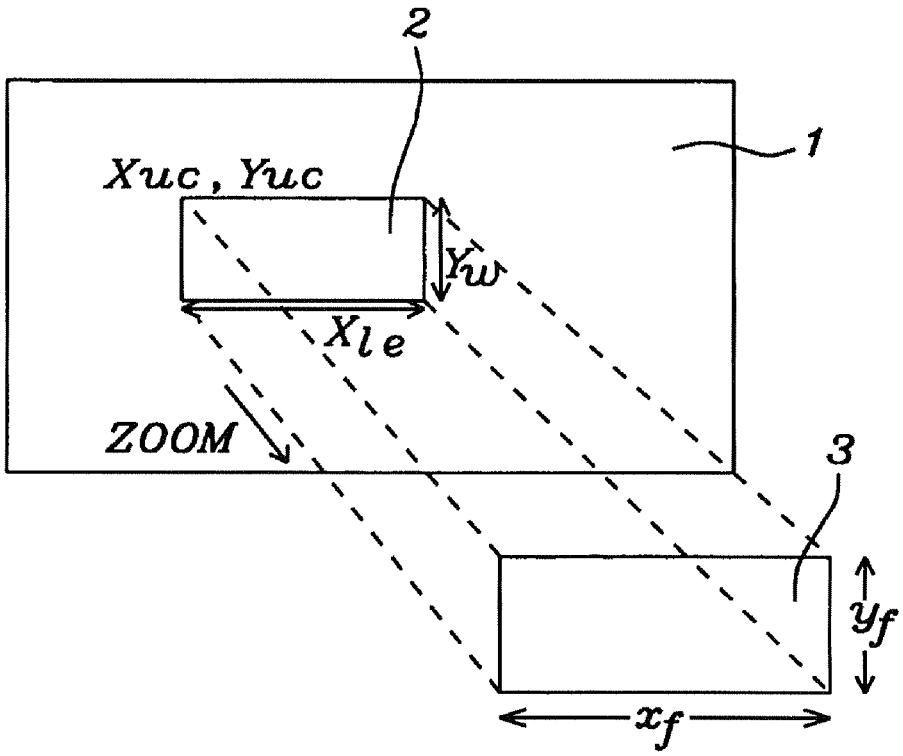
FIG. 1 shows the major components of zooming of a digital image.

FIG. 1 shows the basic components of digital zooming. There is a source image 1, a region of interest (area to be zoomed) 2, and a destination image 3. Said destination image 3 has a fixed size. The region of interest 2 has a shape of a rectangle and is defined by e.g. the coordinates $x_{uc}$, $y_{uc}$ of the upper left corner, the length $x_{le}$ in x-direction and the width $y_w$ in y-direction. These parameters $x_{uc}$, $y_{uc}$, $x_{le}$, and $y_w$ are variables and define the zooming factors in x- and y-direction compared to the fixed rectangular size of the destination image 3 having a fixed length $x_f$ and fixed width $y_f$. Other parameters to define the region of interest are possible as well, e.g. the coordinates of corners of the rectangle being located diagonally to each other. The resolution of the region of interest is either decimated or enlarged to fit into the destination image. The destination image 3 can be larger or smaller than the region of interest 2, depending upon the zooming factors in x- and y-direction.

Other shapes than rectangles for the region of interest and for the destination image, e.g. circles, are possible as well. Using rectangles is the simplest way to achieve zooming.

The methods invented apply to video images as well to still images of a digital camera.

Figure 2:
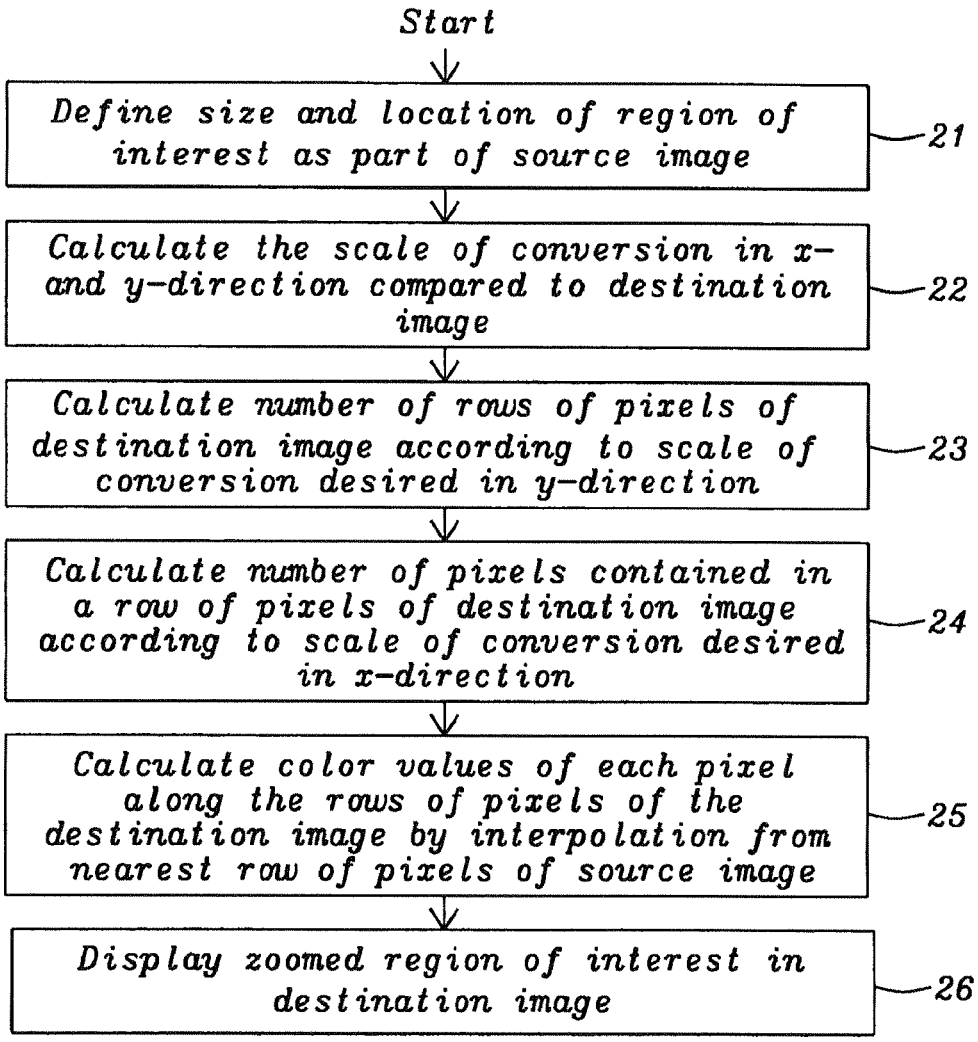
FIG. 2 shows a flowchart of a method how to zoom a digital image.

The flowchart of FIG. 2 shows the principal steps of a method to zoom a digital image. The first step 21 describes the definition of the size and location of the region of interest, in other words of the area to be zoomed. In a preferred embodiment said definition is performed according to the example shown in FIG. 1, using the coordinates $x_{uc}$, $y_{uc}$ of the upper left corner of the region of interest, its length $x_{le}$ in x-direction and its width $y_w$ in y-direction. Another alternative to define the size and location of the region of interest could be to define the location of two corners, being located diagonally to each other as e.g. the upper left corner and the location of the bottom right corner and calculate the length and the width of the region of interest using the coordinates of these two corners. Many more definitions are possible. The following steps 22-26 follow the methods of conversion of the resolution of digital images as disclosed in U.S. patent application Ser. No. 10/830,329 filed Apr. 22, 2004.

Said methods describe a very fast and simple way to decrease or to increase the resolution of digital images and still maintain an acceptable quality of the images. In case of a decimation of the resolution of a digital image the method invented comprises a combination of using simultaneously two different procedures, first, a decimation filter, or interpolation, along one coordinate to calculate the color values of the destination pixels and, second, omitting some rows of source pixels along the other coordinate of an image according to the scale of conversion. In case of an increase of the resolution of a digital image the method invented comprises a similar combination of procedures, first, an interpolation of source pixels to calculate the color values of the increased number of destination pixels, second, an extrapolation of the color values of the destination pixels being very close to the edges of the destination image, and, third, a replication of rows of the destination image to gain additional rows of destination pixels according to the scale of enlargement.

Step 22 of the flowchart of FIG. 2 describes the calculation of the scale of conversion in x- and y-direction from the region of interest to get the destination image. The scale of conversion is calculated in x-direction using the following equation:

$$\text{offsetx} = \frac{X_{LE}}{X_F},$$

wherein offsetx is the scale of decimation in x-direction, $X_{LE}$ is the length of the region of interest, and $X_F$ is the fixed length of the destination image (as shown in FIG. 1). The scale of conversion is calculated in y-direction using the following equation:

$$\text{offsety} = \frac{Y_W}{Y_F},$$

wherein offsety is the scale of decimation in y-direction, $Y_w$ is the width of the region of interest, and $Y_F$ is the fixed width of the destination image (as shown in FIG. 1). Step 23 describes the calculation of number of rows of pixels of the destination image according to scale of conversion desired in y-direction and calculated in the previous step. In case of decimation of the region of interest some rows of the region of interest will be omitted, in case of enlargement additional rows will be replicated. In the next step 24 the number of pixels contained in a row of pixels of the destination image is calculated according to the scale of conversion desired in x-direction and calculated in step 22. The following step 25 comprises the calculation of the color values of each pixel along the rows of pixels of the destination image by interpolation from nearest row of the source image (region of interest). The last step 26 comprises the display of the zoomed region of interest in destination image.

Figure 3:
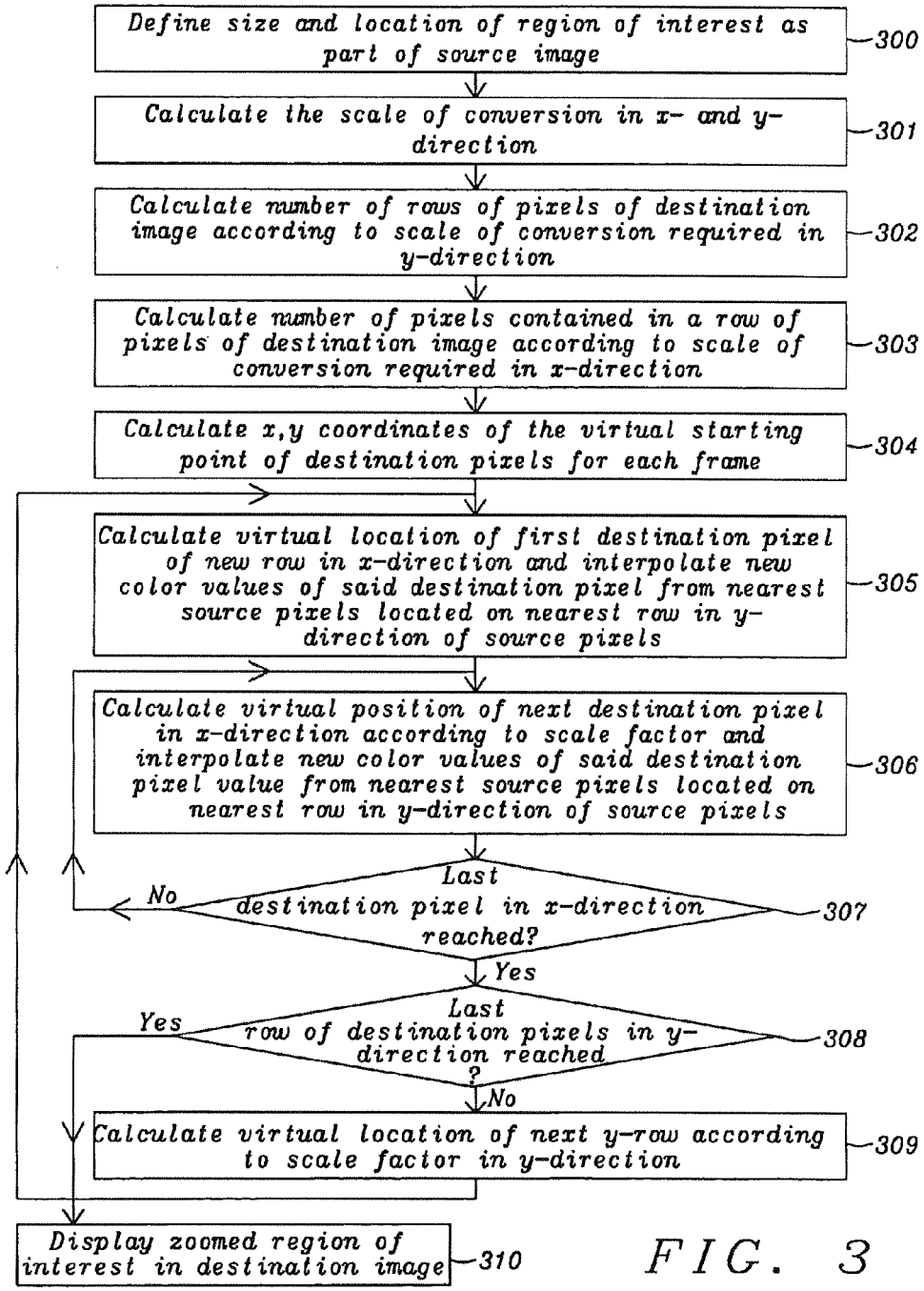
FIG. 3 shows a detailed flowchart of a method how to zoom a digital image.

FIG. 3 describes in more details a method of the present invention to zoom a digital image. The first step 300 describes the definition of the size and location of the region of interest, in other words of the area to be zoomed. In a preferred embodiment said definition is performed according to the example shown in FIG. 1, using the coordinates $x_{uc}$, $y_{uc}$ of the upper left corner of the region of interest, its length $x_{le}$ in x-direction and its width $y_w$ in y-direction. Another alternative to define the size and location of the region of interest could be to define the location of the upper left corner and the location of the bottom left corner and calculate the length and the width of the region of interest using the coordinates of these two corners. Many more definitions are possible. The following steps 301-309 follow the methods of conversion of the resolution of digital images as disclosed in U.S. patent application U.S. Ser. No. 10/830,329 filed Apr. 22, 2004. Step 301 of said method comprises the calculation of the scale of conversion in x- and y-direction. Using the example shown in FIG. 1, the scale of conversion offsetx is in x-direction is $$\text{offsetx} = \frac{X_{LE}}{X_F},$$

wherein $X_{LE}$ is the length of the region of interest, and $X_F$ is the fixed length of the destination image (as shown in FIG. 1). The scale of conversion is calculated in y-direction using the following equation:

$$\text{offsety} = \frac{Y_W}{Y_F},$$

wherein offsety is the scale of conversion in y-direction, $Y_w$ is the width of the region of interest, and $Y_F$ is the fixed width of the destination image (as shown in FIG. 1). The next step 302 comprises the calculation of number of rows of pixels of the destination image according to the scale of conversion desired in y-direction. The following step 303 describes the calculation of the number of pixels contained in a row of pixels of the destination image according to the scale of conversion required in x-direction. The following step 304 comprises the calculation of the x, y coordinates of the virtual starting point of destination pixels for a new frame. Said starting point, which is the middle of the first pixel, is calculated using the conversion scales calculated in the previous step. The location of the starting point calculated is a "virtual" location; it is used for interpolation only. It does not describe the actual physical location of the destination pixel. The "virtual" distance dist1x of the middle of the first pixel from the edge of the image in x-directions is:

$$\text{dist1x}=\text{offsetx}\times\text{pixelwidthx}/2,$$

wherein offsetx is the scale of conversion of the resolution in x-direction calculated in step 301, pixelwidthx is the width of a source pixel in x-direction. The distance dist1y of the middle of the first pixel from the edge of the image in y-directions is:

$$\text{dist1y}=\text{offsety}4/2\times\text{pixelwidthy}/2,$$

wherein offsety is the scale of conversion of the resolution in y-direction calculated in step 301, pixelwidthy is the width of a source pixel in y-direction. Usually the pixelwidth of a source image is identical in x- and y-direction. As explained above said distance dist1y is used to locate and identify the nearest row of pixels of the source image and distance dist1x is used to locate the nearest pixels of said nearest row of the source image for the purpose of interpolation in x-direction. In step 305 the starting point of the first destination pixel in x-direction for a new row and the color values of said first pixel of a new row of the destination image are calculated. The number of color values to be calculated depends upon the color space used. The calculation of the starting point of step 305 is identical to the calculation used in step 304. Furthermore the color values of the first pixel of a new row of the destination image are calculated by interpolation. In a preferred embodiment a linear interpolation of the color values of the two nearest pixels of the source image has been used. All color values of the color space used get interpolated to define the colors of the first pixel of a new row of the destination image. The color space used could be e.g. RGB, YcbCr, YUV or any other color space comprising three or more colors.

In case YUV color space is used luminance would be handled the same way as chrominance. Any polynomial of nth order could be used for interpolation, although order 0 (taking the color value of the nearest pixel) and order 1 (linear interpolation of the color values of the nearest two pixels) are the simplest polynomials to be used. In a preferred embodiment an interpolation of order 1 is used with the exception of pixels of the destination image having a virtual position between the first, or most left-sided, pixel of the nearest row of the source image and the left side edge of the image or correspondingly between the last, or most right-sided, pixel of the nearest row of the source image and the right-side edge of the image. For these "peripheral" pixels an interpolation of the order 0 is used, this means the first, or correspondingly, the last pixel of the nearest row of the source image is replicated.

In case of enlargement, neighboring pixels outside the region of interest can be used alternatively in order to enable an interpolation of order 1 for the peripheral pixels of the region of interest, thus achieving a better quality at the border of the destination image.

In the following step 306 the "virtual" position of the next destination pixel in x-direction of the current y-line according to the scale factor is calculated as described above, and the correspondent color values of all colors of the color space used are calculated by an interpolation of the correspondent color values of the nearest source pixels.

The next step 307 checks if the last pixel location in the current y-line of the destination imaged has been reached. In case the last pixel location has not been reached the process flow goes back to step 306 and the next "virtual" location is calculated and the correspondent color values are interpolated. In case the last destination location in x-direction has been reached the process flow goes to step 308. Step 308 checks if the last row in y-direction has been reached. In case the last row in y-direction has been reached the resolution of the source image has been successfully converted and the process flow goes to the last step 310. In case the last row in y-direction has not yet reached, the process flow goes to step 309 wherein the "virtual" position of the next row in y-direction of the destination image is calculated and then the process flow goes back to step 305 wherein the location of the first pixel of the new y-row of the destination image and the correspondent color values of said pixel line are calculated. Step 310 describes the display of the zoomed region of interest in the destination image.

It is obvious to those skilled in art that rows and columns could be interchanged as well. This means that the interpolation, described above could be performed also in y-direction from the nearest column of the source image.

While the invention has been particularly shown and described with reference to the preferred embodiments thereof, it will be understood by those skilled in the art that to various changes in form and details may be made without departing from the spirit and scope of the invention.

What is claimed is:

1. A method to zoom a region of interest from a [digital] source image, wherein a resolution of the region of interest is either [decimated] *reduced* or enlarged to fit into a destination image, comprising:

[providing a digital camera to implement the following steps:

(1) define] *defining, with a digital camera, a* size and *a* location of [said] *the* region of interest as part of [said] *the* source image;

[(2) calculate scale of conversion in x- and y-direction;

(3) calculate number of rows of pixels of said destination image according to scale of conversion desired in y-direction;

(4) calculate number of pixels contained in a row of pixels of said destination image according to scale of conversion desired in x-direction;

(5) calculate] *interpolating, with the digital camera, multiple pixels in the source image to generate* color values [of each pixel along the rows] of pixels of the destination image [by interpolation from nearest row of pixels of said source image wherein the color values of the pixels of the destination image being located] *corresponding to locations within the region of interest in the source image;*

*replicating, with the digital camera, a first, or correspondingly a last, pixel of a nearest row in the source image for use as color values of pixels in the destination image corresponding to locations* between the left side edge of the source image and [the] *a* first pixel of the nearest row of pixels of the region of interest of the source image and [the color values of the pixels of the destination image being located] between the right side edge of the source image and [the] *a* last pixel of the nearest row of the source image [are achieved by replicating the color values of said first, or correspondingly said last, pixel of the nearest row of the source image]; and

[(6) display] *displaying, with the digital camera, the* zoomed region of interest in [said] *the* destination image.

2. The method of claim 1 wherein *interpolating the color values of each pixel along rows of pixels of the destination image is performed by* a linear interpolation [method has been used] *from a nearest row of pixels of the source image*.

3. The method of claim 1 wherein the color values of the pixels of the destination image being located between the left side edge of the source image and the first pixel of the nearest row of pixels of the region of interest of the source image and the color values of the pixels of the destination image being located between the right side edge of the source image and the last pixel of the nearest row of the source image are achieved by interpolating the color values of [said] *the* first, or correspondingly [said] *the* last, pixel of the nearest row of the source image with a neighboring [pixels] *pixel* outside the region of interest of the source image.

4. The method of claim 1 wherein [said] *the* digital image is a color image using any color space.

5. The method of claim 4 wherein [said] *the* color space is a R-G-B color space.

6. The method of claim 4 wherein [said] *the* color space is an YCbCr color space.

7. The method of claim 1 wherein [said] *the* digital image is a video image.

8. The method of claim 1 wherein [said] *the* digital image is a still image from a digital camera.

9. The method of claim 1 wherein [said] *the* region of interest has the shape of a rectangle.

10. The method of claim 1 wherein [said] *the* destination image has the shape of a rectangle.

11. The method of claim 1 wherein [said method invented is used] *the digital camera is configured* to convert the resolution of the region of interest in any direction.

12. The method of claim 1 wherein [said method invented is implemented using] *the digital camera is configured to use* one common software program.

13. A method to zoom a region of interest from a [digital] source image, wherein a resolution of the region of interest is either [decimated] *reduced* or enlarged to fit into a destination image, [providing a digital camera to implement the following steps] *the method comprising*:

[(1) define] *defining, with a digital camera, a* size and *a* location of [said] *the* region of interest as part of [said] *the* source image;

[(2) calculate scale of conversion in x-and y-direction;

(3) calculate number of columns of pixels of said destination image according to scale of conversion desired in x-direction;

(4) calculate number of pixels contained in a column of pixels of said destination image according to scale of conversion desired in y-direction;

(5) calculate] *interpolating, with the digital camera, multiple pixels in the source image to generate* color values [of columns] of pixels of [said] *the* destination image [by interpolation from nearest column of pixels of source image wherein the color values of the pixels of the destination image being located] *corresponding to locations within the region of interest in the source image;*

*replicating, with the digital camera, a first, or correspondingly a last, pixel of a nearest column in the source image for use as color values of pixels in the destination image corresponding to locations* between the upper side edge of the source image and the first pixel of the nearest column of pixels of the source image and [the color values of the pixels of the destination image being located] between the bottom side edge of the source image and the last pixel of the nearest column of the source image [are achieved by replicating the color values of said first, or correspondingly said last, pixel of the nearest column of the source image.]; and

[(6) display] *displaying, with the digital camera, the* zoomed region of interest in [said] *the* destination image.

14. The method of claim 13 wherein *interpolating the color values of each pixel along rows of pixels of the destination image is performed by* a linear interpolation [method has been used] *from the nearest column of pixels of the source image*.

15. The method of claim 13 wherein the color values of the pixels of the destination image being located between the left side edge of the source image and the first pixel of the nearest row of pixels of the region of interest of the source image and the color values of the pixels of the destination image being located between the right side edge of the source image and the last pixel of the nearest row of the source image are achieved by interpolating the color values of [said] *the* first, or correspondingly [said] *the* last, pixel of the nearest row of the source image with a neighboring [pixels] *pixel* outside the region of interest of the source image.

16. The method of claim 13 wherein said digital image is a color image using any color space.

17. The method of claim 16 wherein [said] *the* color space is a R-G-B color space.

18. The method of *claim* 16 wherein [said] *the* color space is an YCbCr color space.

19. The method of claim 13 wherein [said] *the* digital image is a video image.

20. The method of claim 13 wherein [said] *the* digital image is a still image from a [digit] *digital* camera.

21. The method of claim 13 wherein [said method invented is used] *the digital camera is configured* to convert the resolution of the region of interest in any direction.

22. The method of claim 13 wherein [said] *the* region of interest has the shape of a rectangle.

23. The method of claim 13 wherein [said] *the* destination image has the shape of a rectangle.

24. The method of claim 13 wherein [said method invented is implemented using] *the digital camera is configured to use* one common software program.

25. A method to zoom a region of interest from a [digital] source image, wherein a resolution of the region of interest is either [decimated] *reduced* or enlarged to fit into a destination image, comprising:

[providing a digital camera to implement the following steps:

(1) define size and location of said region of interest as part of said source image;

(2) calculate the scale of conversion of the resolution in x-and y-direction;

(3) calculate number of rows of pixels of said destination image according to scale of conversion desired in y-direction;

(4) calculate number of pixels contained in a row of pixels of said destination image according to scale of conversion desired in x-direction;

(5) calculate x, y virtual starting point of said destination pixel for each frame;

(6) calculate] *calculating, with a digital camera, a* virtual location of first destination pixel for *a* new row in *an* x-direction [and interpolate]*;*

*replicating, with the digital camera, a first, or correspondingly, a last, pixel of a nearest row of a source image to generate a* new color [values] *value* of color space of [said] *the* first destination pixel [from nearest source pixels located at nearest row of source pixels in y-direction wherein the color values of the pixels of the destination image being located] *corresponding to a location* between the left side edge of the source image and the first pixel of the nearest row of pixels of the source image [and the color values of the pixels of the destination image being located] *or* between the right side edge of the source image and the last pixel of the nearest row of the source image [are achieved by replicating the color values of said first, or correspondingly said last, pixel of the nearest row of the source image];

[(7) calculate] *calculating, with the digital camera, a* virtual position of next destination pixel in *the* x-direction according to *a* scale factor [and interpolate] *between the region of interest of the source image and the destination image, wherein the virtual position of next destination pixel corresponds to a location within the region of interest in the source image;*

*interpolating, with the digital camera,* new color values of color space [used] of [said] *the* next *destination* pixel from nearest source pixels located at *a* nearest row of source pixels in *the* y-direction [wherein the color values of the pixels of the destination image being located between the left side edge of the source image and the first pixel of the nearest row of pixels of the source image and the color values of the pixels of the destination image being located between the right side edge of the source image and the last pixel of the nearest row of the source image are achieved by replicating the color values of said first, or correspondingly said last, pixel of the nearest row of the source image]; *and*

[(8) go to next step (9) if last destination pixel in x-direction has been reached otherwise go to step (6);

(9) go to step (11) if last row of destination pixels has been reached otherwise go to next step (10);

(10) calculate virtual location of next row in y-direction according to scale factor in y-direction and go to step (5); and

(11) display] *displaying, with the digital camera, the* zoomed region of interest in [said] *the* destination image.

26. The method of claim 25 wherein [a] *interpolating the new color values of color space is performed through* linear interpolation [method has been used].

27. The method of claim 25 wherein the color values of the pixels of the destination image being located between the left side edge of the source image and the first pixel of the nearest row of pixels of the region of interest of the source image and the color values of the pixels of the destination image being located between the right side edge of the source image and the last pixel of the nearest row of the source image are achieved by interpolating the color values of [said] *the* first, or correspondingly [said] *the* last, pixel of the nearest row of the source image with a neighboring [pixels] *pixel* outside the region of interest of the source image.

28. The method of claim 25 wherein [said] *the* digital image is a color image using any color space.

29. The method of claim 28 wherein [said] *the* color space is a R-G-B color space.

30. The method of claim 25 wherein [said] *the* color space is an YCbCr color space.

31. The method of claim 25 wherein [said] *the* digital image is a video image.

32. The method of claim 25 wherein [said] *the* digital image is a still image from a digital camera.

33. The method of claim 25 wherein [said method invented is used] *the digital camera is configured* to convert the resolution of the region of interest in any direction.

34. The method of claim 25 wherein [said] *the* region of interest has the shape of a rectangle.

35. The method of claim 25 wherein [said] *the* destination image has the shape of a rectangle.

36. The method of claim 25 wherein [said method invented is implemented using] *the digital camera is configured to use* one common software program.

37. A method to zoom a region of interest from a [digital] source image, wherein a resolution of the region of interest is either [decimated] *reduced* or enlarged to fit into a destination image, comprising:

[providing a digital camera to implement the following steps:

(1) define size and location of said region of interest as part of said source image;

(2) calculate the scale of decimation in x-and y-direction;

(3) calculate number of columns of pixels of said destination image according to scale of conversion desired in x-direction;

(4) calculate number of pixels contained in a column of pixels of said destination image according to scale of conversion desired in y-direction;

(5) calculate x, y virtual starting point of a destination pixel for each frame;

(6) calculate] *calculating, with a digital camera, a* virtual location of first destination pixel for new column in *a* y-direction [and interpolate new]*;*

*determining, with the digital camera, a* color [values] *value* of color space of [said] *the* first destination pixel, *wherein the determining of the color value comprises selecting, based on a location of the first destination pixel relative to the region of interest, between interpolating the color value* from nearest source pixels located at nearest column of source pixels in *a* x-direction *replicating the color value corresponding to the first destination pixel in the source image*;

[(7) calculate] *calculating, with the digital camera, a* virtual position of next destination pixel in *the* y-direction according to *a* scale factor [and interpolate new] *between the region of interest and the destination image;*

*determining, with the digital camera, a* color [values] *value* of color space [used] of [said] *the* next *destination* pixel, *wherein the determining of the color value comprises selecting, based on a location of the next destination pixel relative to the region of interest, between interpolating the color value* from nearest source pixels located at nearest column of source pixels in x-direction *or replicating the color value corresponding to the next destination pixel in the source image*; *and*

[(8) go to next step (9) if last destination pixel in y-direction has been reached otherwise go to step (6);

(9) go to step (11) if last column of destination pixels has been reached otherwise go to next step (10);

(10) calculate virtual location of next column in x-direction according to scale factor in x-direction and go to step (5); and

(11) display] *displaying, with a digital camera, the* zoomed region of interest in [said] *the* destination image.

*38. An apparatus comprising:*

*a digital camera configured to reduce or enlarge a region of interest in a source image to fit into a destination image and to interpolate color values for pixels in the destination image corresponding to locations within the region of interest from multiple pixels in the source image, wherein the digital camera is configured to replicate a color value of a first pixel or a last pixel of a nearest row of the source image to achieve the color values of the pixels of the destination image located between a left side edge of the source image and the first pixel of the nearest row of pixels in the region of interest of the source image or to achieve the color values of the pixels of the destination image being located between a right side edge of the source image and the last pixel of the nearest row of the source image.*

*39. The apparatus of claim 38, wherein the digital camera is configured to display the enlarged region of interest in the destination image.*

*40. The apparatus of claim 38, wherein the digital camera is configured to display the reduced region of interest in the destination image.*

*41. The apparatus of claim 38, wherein the digital camera is configured to determine a scaling factor between the region of interest in the source image and the destination image, and to reduce or enlarge the region of interest to fit into the destination image based on the scaling factor.*

*42. The apparatus of claim 38, wherein the digital camera is configured to identify a location of the region of interest in the source image from a point in the source image and a size of sides of the region of interest.*

*43. The apparatus of claim 38, wherein the digital camera is configured to determine a number of rows or columns in the destination image.*

*44. The apparatus of claim 43, wherein the digital camera is configured to eliminate at least one row or column from the source image to fit the region of interest in the destination image.*

*45. The apparatus of claim 43, wherein the digital camera is configured to interpolate at least one additional row or column from the source image to fit the region of interest in the destination image.*

*46. An apparatus comprising:*

*a digital camera configured to reduce or enlarge a region of interest in a source image to fit into a destination image and to interpolate color values for pixels in the destination image corresponding to locations within the region of interest from multiple pixels in the source image, wherein the digital camera is configured to replicate a color value of a first pixel or a last pixel of a nearest column of the source image to achieve the color values of the pixels of the destination image located between an upper side edge of the source image and the first pixel of the nearest column of pixels in the region of interest of the source image or to achieve the color values of the pixels of the destination image being located between a bottom side edge of the source image and the last pixel of the nearest column of the source image.*

*47. The apparatus of claim 46, wherein the digital camera is configured to display the enlarged region of interest in the destination image.*

*48. The apparatus of claim 46, wherein the digital camera is configured to display the reduced region of interest in the destination image.*

*49. The apparatus of claim 46, wherein the digital camera is configured to determine a sealing factor between the region of interest in the source image and the destination image, and to reduce or enlarge the region of interest to fit into the destination image based on the scaling factor.*

*50. The apparatus of claim 46, wherein the digital camera is configured to identify a location of the region of interest in the source image from a point in the source image and a size of sides of the region of interest.*

*51. The apparatus of claim 46, wherein the digital camera is configured to determine a number of rows or columns in the destination image.*

*52. The apparatus of claim 51, wherein the digital camera is configured to eliminate at least one row or column from the source image to fit the region of interest in the destination image.*

*53. The apparatus of claim 51, wherein the digital camera is configured to interpolate at least one additional row or column from the source image to fit the region of interest in the destination image.*

* * * * *